E. D. HARDING.
TRUCK BRAKE.
APPLICATION FILED JUNE 26, 1909.
961,494.
Patented June 14, 1910.
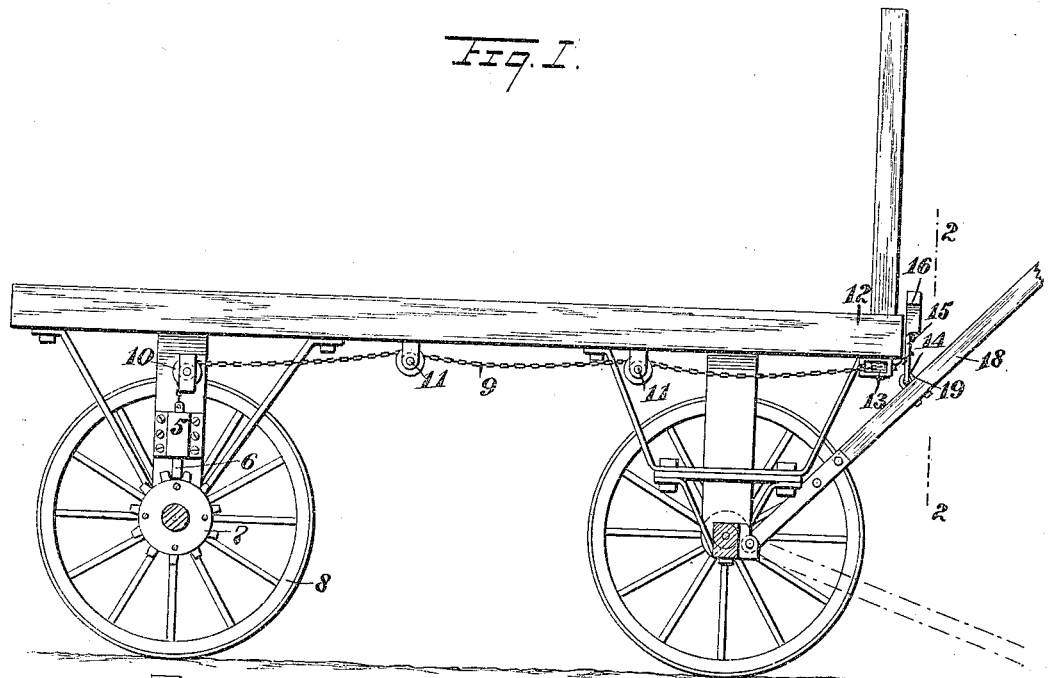
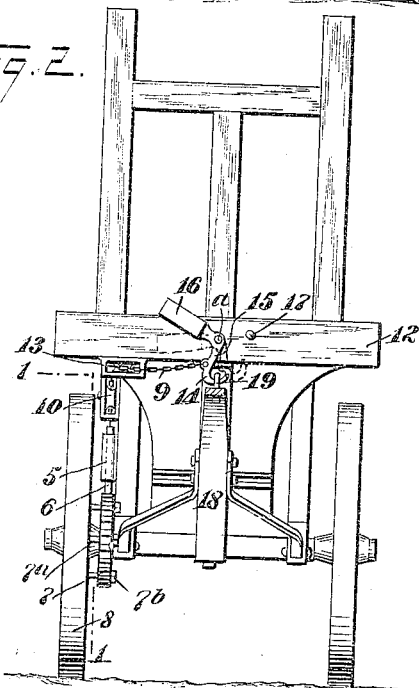
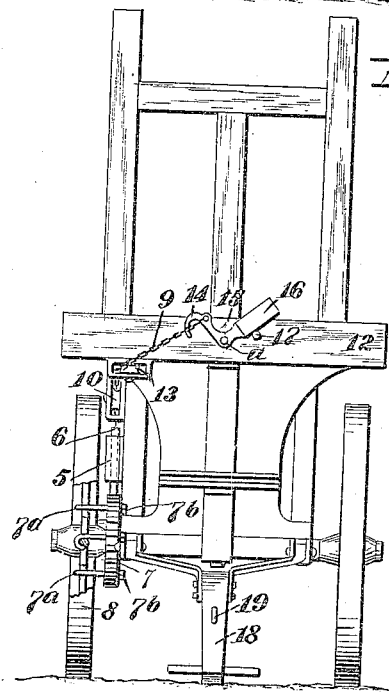
WITNESSES
A. J. Walker
E. B. Marshall
INVENTOR
Elmon D. Harding
BY
Munn & Co
ATTORNEYS

UNITED STATES PATENT OFFICE.

ELMON D. HARDING, OF MONTEVIDEO, MINNESOTA.

TRUCK-BRAKE.

961,494.  Specification of Letters Patent.  Patented June 14, 1910.

Application filed June 26, 1909. Serial No. 504,498.

*To all whom it may concern:*

Be it known that I, ELMON D. HARDING, a citizen of the United States, and a resident of Montevideo, in the county of Chippewa and State of Minnesota, have invented a new and Improved Truck-Brake, of which the following is a full, clear, and exact description.

My invention relates to truck brakes, and more especially to brakes on trucks used at railway stations, and it has for its object to provide means which will automatically operate the brake when the platform man hangs up the tongue of the truck.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views.

Figure 1 is a side elevation of a truck having my invention applied thereto, parts being in section on the line 1—1 of Fig. 2; Fig. 2 is a front elevation of the truck, partly in section on the line 2—2 of Fig. 1; and Fig. 3 is a front elevation of the truck showing the tongue resting on the ground.

By referring to the drawings, it will be seen that the truck is of the usual form, and that it is provided with a guide 5, in which is disposed a bolt 6, the bolt being adapted to engage a sprocket wheel 7 secured to one of the wheels 8 of the truck. The preferred manner of securing the sprocket wheel 7 to the wheel 8 is to provide looped rods 7ª, the loops of which are disposed around the spokes of the wheel 8, the rods passing through orifices in the sprocket wheels 7 and being held in place by nuts 7ᵇ, which mesh with threads on the rods. A chain 9 is secured to the bolt 6, and passes over a pulley 10, and also over pulleys 11 to the front 12 of the truck.

At the front of the truck there is a pulley 13, the axis of which is vertical, the chain 9 passing around the pulley 13, and being secured to a hook 14 on one arm 15 of a bent lever, the other arm 16 of the lever being weighted. A pin 17 is secured to the front of the truck at one side of the arm 16 of the lever, its purpose being to limit the movement of the lever, as best shown in Fig. 3. The fulcrum *a* of the bent lever is immediately above the tongue 18, which is pivoted to the truck in the customary manner. This tongue 18 is provided with a staple 19 with which the hook 14 is adapted to engage.

The trucks used on station platforms are equipped with hooks to hold up their tongues, and railroad employees are instructed to have the tongues supported by the said hooks at all times when the trucks are not in use, the purpose of this requirement being to prevent passengers from falling over the tongues, and also to prevent the tongues from becoming damaged.

In using my invention, when the employee hangs the tongue up by means of the engagement of the hook 14 with the staple 19, the lever 15 is held stationary with the weighted arm 16 upwardly disposed, and in this position the chain 9 is long enough so that it does not draw the bolt 6 away from the sprocket wheel 7. However, when the hook 14 is freed from the staple 19 of the tongue 18, the weighted arm 16 will descend and the hook 14 will ascend toward the right, which will draw on the chain 9, by which means the bolt 6 will be drawn upwardly away from the sprocket wheel 7, thereby disengaging the brake mechanism. If at any time it should be desired to free the tongue 18 and at the same time retain the brake mechanism in operative position, the weighted arm 16 of the lever 15 is moved to the right so that it rests against the pin 17, as best shown in Fig. 3 of the drawings. In this position the hook 14 does not draw on the chain 9, and there is therefore no movement of the bolt 6.

Having thus described my invention, I claim as new and desire to secure by Letters Patent:

1. In combination with a truck, a wheel mounted to rotate, a sprocket wheel secured thereto, a bolt disposed to engage the teeth in the sprocket wheel, a pulley, a flexible means to which the bolt is secured, the flexible means being disposed over the pulley, a pivoted tongue, and a lever disposed over the tongue, one arm of the lever being in the form of a hook adapted to engage the tongue, the other arm of the lever being weighted, the flexible means being secured to the lever.

2. In combination with a truck, a wheel mounted to rotate, a member secured to the wheel having a recess, a guide, a bolt disposed in the guide adapted to be introduced into the recess, a pulley, a flexible means, one end of which is secured to the bolt and is disposed over the pulley, a pivoted hook having a weighted arm to which the other end of the flexible means is secured, and a pivoted tongue, the hook being adapted to engage the tongue.

3. In combination with a truck, a wheel mounted to rotate, means to prevent the rotation of the wheel, a pivoted tongue, a lever having one arm formed in the shape of a hook, which is adapted to engage the tongue to support it, and a flexible means, one end of which is connected to the said means to operate them, the other end of the flexible means being secured to the lever.

4. In combination with a truck, a wheel mounted to rotate, means to prevent the rotation of the wheel, a pivoted tongue, a lever pivoted over the tongue having one arm in the shape of a hook, means to hold the arm yieldingly upward, means to limit the movement of the lever, and a flexible means, one end of which is connected to the first-mentioned means to operate it, the other end of the flexible means being secured to the lever.

5. In combination with a truck, a wheel, means to prevent the rotation of the wheel, a pivoted tongue, a lever mounted thereover, one arm of the lever being in the form of a hook adapted to engage an eye in the tongue, the other arm being weighted, a pin at one side of the fulcrum of the lever adapted to limit its movement, and flexible means connected at one end with the said means to operate them, the other end of the flexible means being secured to the hook of the lever.

6. In combination with a truck, a wheel mounted to rotate, a sprocket wheel secured thereto, a guide, a bolt disposed in the guide adapted to engage the sprocket wheel, a pulley disposed over the guide, a flexible means secured at one end to the bolt and disposed over the pulley, a pivoted tongue, and a lever mounted thereover, one arm of the lever being in the form of a hook adapted to engage an eye in the tongue, the other arm of the lever being weighted, and the other end of the flexible means being secured to the hook of the lever.

In testimony whereof I have signed my name to this specification in the presence of two subscribing witnesses.

ELMON D. HARDING.

Witnesses:
C. D. BENSEL,
CHARLES WALDECK.